United States Patent
Huh et al.

(10) Patent No.: US 11,838,168 B2
(45) Date of Patent: Dec. 5, 2023

(54) METHOD FOR SUPPORTING RECEIVING OPERATION BASED ON 2D-NUC AND WIRELESS DEVICE USING SAME

(71) Applicant: LG ELECTRONICS INC., Seoul (KR)

(72) Inventors: Joongkwan Huh, Seoul (KR); Jaewook Song, Seoul (KR); Kyuin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 84 days.

(21) Appl. No.: 17/593,774

(22) PCT Filed: Apr. 30, 2019

(86) PCT No.: PCT/KR2019/005177
§ 371 (c)(1),
(2) Date: Sep. 24, 2021

(87) PCT Pub. No.: WO2020/222323
PCT Pub. Date: Nov. 5, 2020

(65) Prior Publication Data
US 2022/0173956 A1  Jun. 2, 2022

(51) Int. Cl.
*H04L 5/00* (2006.01)
*H04L 27/26* (2006.01)
*H04L 27/38* (2006.01)
*H04L 27/34* (2006.01)

(52) U.S. Cl.
CPC ...... *H04L 27/3809* (2013.01); *H04L 27/3427* (2013.01)

(58) Field of Classification Search
CPC ............ H04L 27/3809; H04L 27/3427; H04L 25/03006; H04L 2025/03605; H04L 25/067; H04L 1/00
USPC ........................................................ 375/262
See application file for complete search history.

(56) References Cited

FOREIGN PATENT DOCUMENTS

| CA | 2921893 A1 * | 2/2015 | ............. G11B 27/10 |
|----|--------------|--------|--------|
| KR | 20160111332 | 9/2016 | |
| KR | 20170060037 | 5/2017 | |

OTHER PUBLICATIONS

Manuel Fuentes Muela, Non-Uniform Constellations for Next-Generation Digital Terrestrial Broadcast Systems, Jun. 2017 (Year: 2017).*
Yuting Tao*, Hak-Jin Kim*, Sungho Jeon**, and Jong-Soo Seo*, Low-Complexity Switched Soft Demapper for Rotated Non-Uniform Constellation DVB-NGH Systems, Aug. 11, 2014 (Year: 2014).*
PCT International Application No. PCT/KR2019/005177, International Search Report dated Jan. 30, 2020, 6 pages.
(Continued)

*Primary Examiner* — Tanmay K Shah
(74) *Attorney, Agent, or Firm* — LEE HONG DEGERMAN KANG WAIMEY

(57) ABSTRACT

A method for supporting a receiving operation based on 2D-NUC performed by a first wireless device according to the present embodiment, comprises the steps of: receiving first and second input information from a second wireless device; performing equalization on the first and second input information; and generating LLR information on the basis of lookup table information predetermined for the equalized first and second input information and 2D-NUC.

11 Claims, 11 Drawing Sheets

(56) References Cited

OTHER PUBLICATIONS

Muela, "Non-Uniform Constellations for Next-Generation Digital Terrestrial Broadcast Systems," Telecommunications Engineering Valencia, Jul. 2017, 199 pages.
Wu, "Look-Up Table Based Low Complexity LLR Calculation for High-Order Amplitude Phase Shift Keying Signals," IEICE Transactions on Communications vol. E95-B, No. 9, Sep. 2012, 6 pages.
Gutierrez, "Advanced Constellation and Demapper Schemes for Next Generation Digital Terrestrial Television Broadcasting Systems," Faculty of Engineering Bilbao University of the Basque Country, Mar. 2019, 223 pages.

* cited by examiner

METHOD FOR SUPPORTING RECEIVING OPERATION BASED ON 2D-NUC AND WIRELESS DEVICE USING SAME

CROSS-REFERENCE TO RELATED APPLICATIONS

This application is the National Stage filing under 35 U.S.C. 371 of International Application No. PCT/KR2019/005177, filed on Apr. 30, 2019, the contents of which is hereby incorporated by reference herein in its entirety.

BACKGROUND

Field

The present specification relates to a wireless device and, more particularly, to a method for supporting a reception operation based on a 2D-NUC and a wireless device using the same.

Related Art

One-dimensional (1D) non-uniform constellations (NUCs) and 2D-NUCs may be separated according to the constellation form of an NUC. 1D-NUCs have a square constellation form similarly to QAM but exhibit a non-uniform distance between constellation symbols unlike QAM. 2D-NUCs have a non-uniform constellation structure in which a constellation form is not limited to a square shape.

When a 1D-NUC is used, a reception performance gain is achieved compared to a uniform constellation (UC), while a demapper of a reception terminal using the 1D-NUC has a higher complexity than when the UC is used. Further, when a 2D-NUC is used, a reception performance gain is achieved compared to a 1D-NUC, while a demapper of a reception terminal using the 2D-NUC has a higher complexity than when the 1D-NUC is used. In particular, there is a growing need for a 2D-NUC due to a high error vector magnitude (EVM) in a millimeter wave (mmWave) environment that has been receiving increasing attention to achieve a high transmission speed in recent years.

Conventionally, the complexity of a demapper is reduced by decreasing the number N of constellation symbols used for calculating a log-likelihood ratio (LLR), but the demapper still has high complexity to be used in a receiver having a high data rate. However, when the number N is additionally decreased to further reduce the complexity of the demapper, the performance of the demapper included in a reception terminal may deteriorate.

SUMMARY

The present specification is to provide a method for supporting a reception operation based on a 2D-NUC in a receiver having a high data rate while reducing the LLR calculation complexity of a 2D-NUC demapper and a wireless device using the same.

A method for supporting a reception operation based on a 2D-NUC performed by a first wireless device according to an embodiment may include receiving first input information and second input information from a second wireless device; equalizing the first input information and the second input information; and generating LLR information based on the equalized first input information, the equalized second input information, and predetermined lookup table information for the 2D-NUC.

According to an embodiment of the present specification, it is possible to provide a method for supporting a reception operation based on a 2D-NUC in a receiver having a high data rate while reducing the LLR calculation complexity of a 2D-NUC demapper and a wireless device using the same.

DESCRIPTION OF EXEMPLARY EMBODIMENTS

The above-described features and the following detailed description are exemplary contents for helping a description and understanding of the present specification. That is, the present specification is not limited to an embodiment and may be embodied in other forms. The following embodiments are merely examples to fully disclose the present specification, and are descriptions to transfer the present specification to those skilled in the art. Therefore, when there are several methods for implementing components of the present specification, it is necessary to clarify that the present specification may be implemented with a specific one of these methods or equivalent thereof.

In the present specification, when there is a description in which a configuration includes specific elements, or when there is a description in which a process includes specific steps, it means that other elements or other steps may be further included. That is, the terms used in the present specification are only for describing specific embodiments and are not intended to limit the concept of the present specification. Furthermore, the examples described to aid the understanding of the present specification also include complementary embodiments thereof.

The terms used in the present specification have the meaning commonly understood by one of ordinary skill in the art to which the present specification belongs. Terms commonly used should be interpreted in a consistent sense in the context of the present specification. Further, terms used in the present specification should not be interpreted in an idealistic or formal sense unless the meaning is clearly defined. Hereinafter, embodiments of the present specification will be described with reference to the accompanying drawings.

Figure 1:
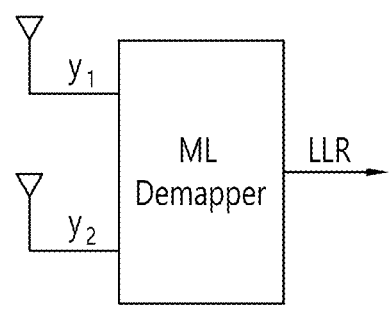
FIG. 1 is a block diagram illustrating an existing demapper.

FIG. 1 is a block diagram illustrating an existing demapper.

Referring to FIG. 1, a maximum likelihood (ML) algorithm according to Equation 1, known as an optimal solution, is applied to the existing demapper.

$$\lambda_m = \log \frac{\sum_{k \in \chi_m^1} \exp\left(-\frac{\|y - Hx\|^2}{\sigma^2}\right)}{\sum_{k \in \chi_m^0} \exp\left(-\frac{\|y - Hx\|^2}{\sigma^2}\right)}$$ [Equation 1]

Symbols included in Equation 1 may be understood as follows. For example, $\lambda_m$ denotes a log likelihood ratio (LLR) value corresponding to all code bits $c_m$.

The subscript m of all code bits $c_m$ may be defined as m=1, ..., B×$N_T$. B denotes the number of bits per symbol used in a single antenna. $N_T$ denotes the number of (transmission or reception) antennas. M denotes the cardinality of set members of a symbol constellation.

In Equation 1, x may correspond to each set member of the symbol constellation. Specifically, $x^0_m$ in Equation 1 denotes a plurality of set members (e.g., a set member disposed on the right of a Q-axis in FIG. 3 described below) having a first bit of 0 included in bit information mapped to the set members of the symbol constellation.

Further, $x^1_m$ in Equation 1 denotes a plurality of set members (e.g., set members disposed on the left of the Q-axis in FIG. 3 described below) having a first bit of 1 included in the bit information mapped to the set members of the symbol constellation.

In Equation 1, y is related to an input signal (y1, y2) received through a reception antenna. In Equation 1, H may be related to a channel function.

For reference, it will be understood that the symbols included in Equation 1 may be used with the same meanings in the following equations in the present specification.

For the existing demapper to calculate an LLR using the ML algorithm, M^($N_T$) Euclidean distance calculations are required. For example, when M is 64 and $N_T$ is 2, 4096 Euclidean distance calculations are required.

To reduce complexity due to the ML algorithm, a sphere decoding algorithm or a Max-Log-Map algorithm according to Equation 2 may be used.

$$\lambda_m = \min_{x \in \chi_m^0}\left(\frac{\|y - Hx\|^2}{\sigma^2}\right) - \min_{x \in \chi_m^1}\left(\frac{\|y - Hx\|^2}{\sigma^2}\right)$$ [Equation 2]

Hereinafter, the present specification illustrates a method for remarkably reducing the complexity of a demapper using the Max-Log-Map algorithm according to Equation 2.

Figure 2:
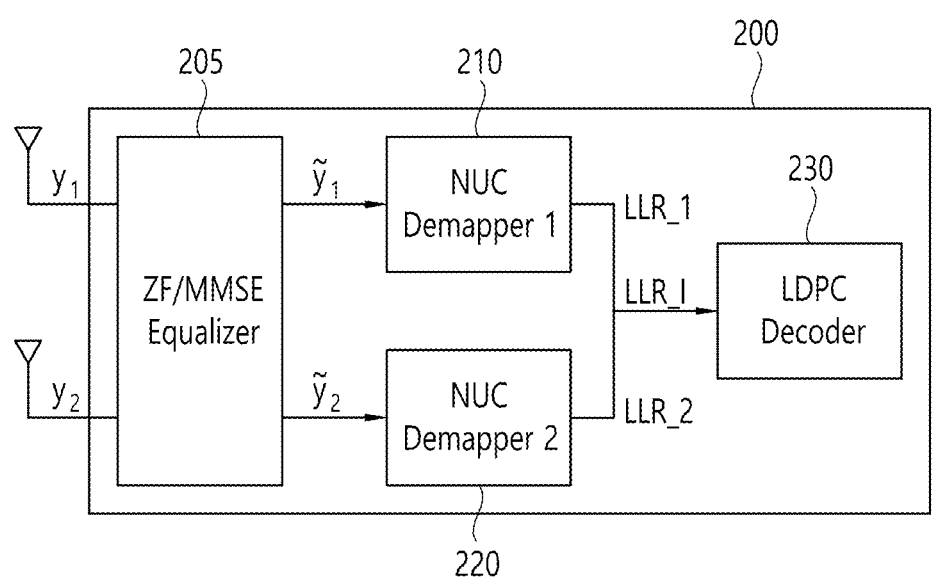
FIG. 2 illustrates a block diagram illustrating an internal structure of a wireless device related to a reception terminal according to an embodiment.

FIG. 2 illustrates a block diagram illustrating an internal structure of a wireless device related to a reception terminal according to an embodiment.

Referring to FIG. 2, the wireless device 200 including two antennas may further include an equalizer 205 as a subop-timal solution. For example, the equalizer 205 may be a zero-forcing (ZF) or minimum mean squared error (MMSE) equalizer 205.

When the internal structure of FIG. 2 is applied, cross components ($h_{12}$, $h_{21}$, and the like) related to a wireless channel may be reduced. Accordingly, the wireless device 200 according to the embodiment may perform independent demapping for each antenna. In this case, the complexity of a demapper may be reduced from $\partial(M^2)$ to $\partial(2M)$.

For example, the ZF/MMSE equalizer 205 may perform equalization based on a plurality of received input signals (y1, y2), thereby generating a plurality of equalized signals ($\tilde{y}1$, $\tilde{y}2$).

When the ZF/MMSE equalizer 205 is used according to the embodiment, Equation 2 for calculating an LLR may be simplified into Equation 3.

$$\lambda_m = \min_{x \in \chi_m^0}\left(\frac{\|\tilde{y} - x\|^2}{\sigma^2}\right) - \min_{x \in \chi_m^1}\left(\frac{\|\tilde{y} - x\|^2}{\sigma^2}\right) =$$ [Equation 3]

$$\underbrace{\left(\min_{x \in \chi_m^0}(\|\tilde{y} - x\|^2) - \min_{x \in \chi_m^1}(\|\tilde{y} - x\|^2)\right)}_{a} \times \frac{1}{\sigma^2}$$

The wireless device 200 according to the embodiment may calculate part a in Equation 3 in advance to be read and used as lookup table (hereinafter, "LUT") information. For example, the LUT information may be stored in advance in a memory (not shown) of the wireless device.

In this case, the complexity of LLR calculation may be reduced to $\partial(1)$ (since a value is read from the memory). Referring to Equation 3, to obtain a final LLR value, a part related to noise power σ is divided.

Here, this process may be omitted depending on a decoding algorithm applied to a decoder 230. For example, when LDPC decoding is performed, a normalized min-sum algorithm does not require normalization of noise power.

Ultimately, when NUC demapping is performed using an LUT according to the embodiment, the performance of the wireless device may be affected by the memory size.

Figure 3:
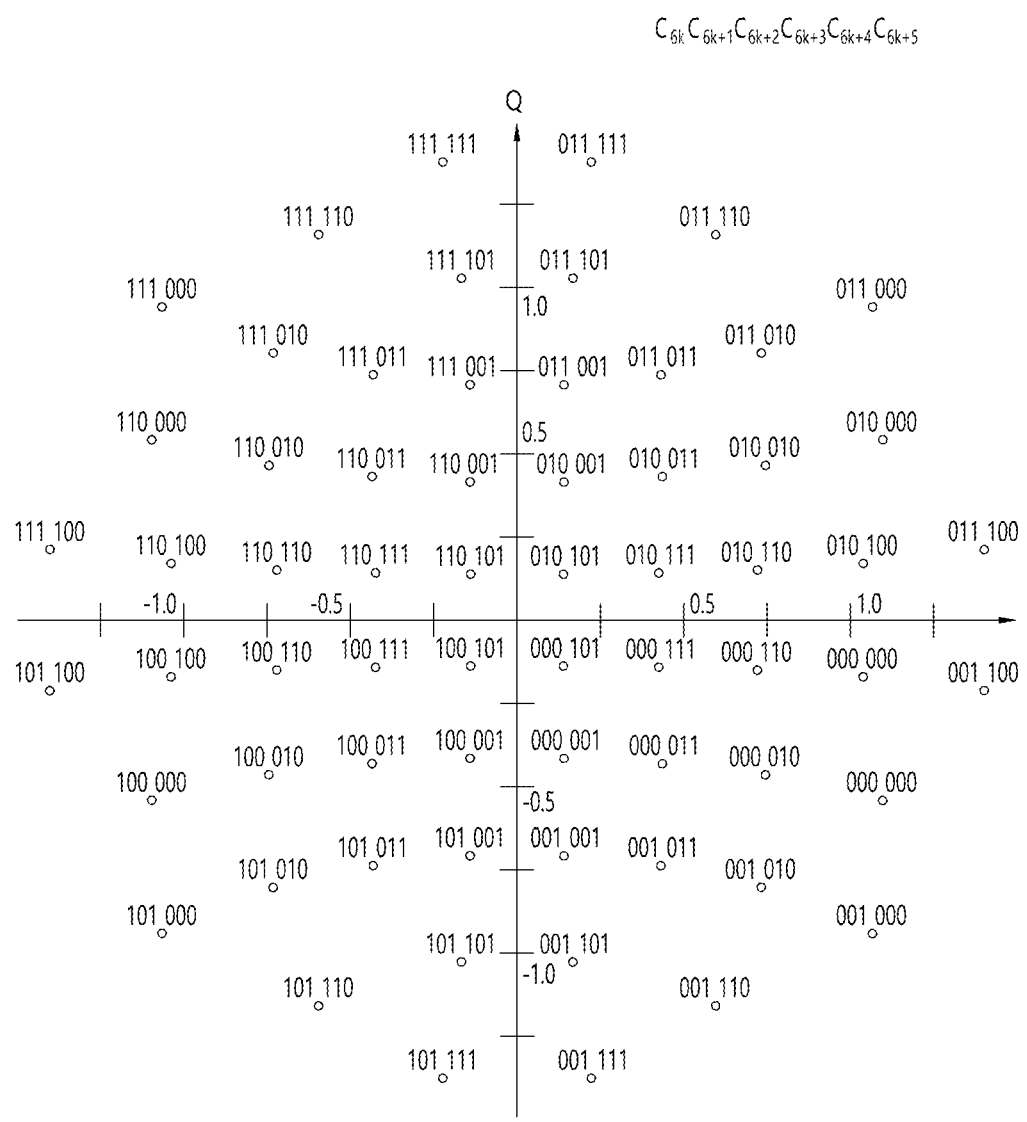
FIG. 3 illustrates a 64-NUC used in the IEEE 802.11ay.

FIG. 3 illustrates a 64-NUC used in IEEE 802.11 ay.

Referring to FIG. 3, 64 NUC symbols are illustrated based on an I-axis and a Q-axis. The NUC symbols of FIG. 3 may be related to 6-bit information ($C_{6k}$ $C_{6k+1}$ $C_{6k+2}$ $C_{6k+3}$ $C_{6k+4}$ $C_{6k+5}$, where k is a natural number).

For example, when the resolution of an LUT for the 64-NUC is set to 32×32, the size of storage space required for a memory may be 32×32×6 (6 bits per 1 symbol)=6 Kbytes. In addition, considering I-Q symmetry, the size of storage space required for the memory may be 1.5 Kbytes.

Figure 4:
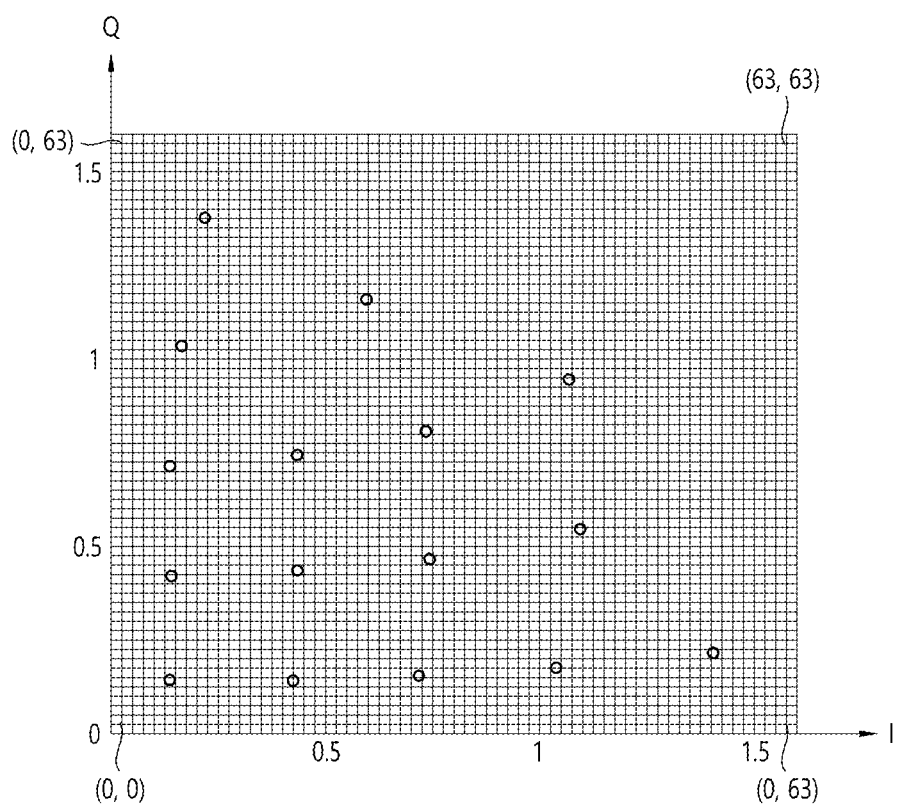
FIG. 4 is a conceptual view illustrating a 64-NUC demapped based on a specific resolution according to an embodiment.

According to the embodiment, when a complex value is input as input information for the 64-NUC of FIG. 4, 9 bits may be allocated for each of an I value and a Q value related to the input information. In this case, since the allocated 9 bits include a sign bit, the I value and the Q value may be understood as values ranging from −255 to +255.

Lower 7 bits of actual I and Q values may be decimal bits. In this case, the I value and the Q value may be expressed as ranging from −255/2^7 to 255/2^7. Further, with fixed-point notation, the I value and the Q value range from −2 to +2 in FIG. 3.

FIG. 4 is a conceptual view illustrating a 64-NUC demapped based on a specific resolution according to an embodiment.

For a clear and concise understanding of FIG. 4, it may be assumed that the same 64-NUC as in FIG. 3 is positioned on the I and Q-axes of FIG. 4. FIG. 4 illustrates part of the 64-NUC having a resolution of 64×64 related to a first quadrant among four quadrants determined by the I-axis and the Q-axis.

A resolution of 128×128 according to the embodiment may be obtained using I-Q symmetry based on the resolution of 64×64 related to the first quadrant of FIG. 4.

For example, in the first quadrant of FIG. 4, (X, Y) based on 64 X indices and 64 Y indices may be determined to range from (0, 0) to (63, 63). In a second quadrant of FIG. 4, (X, Y) based on 64 X indices and 64 Y indices may be determined to range from (−1, 0) to (−64, 63).

For example, in a third quadrant of FIG. 4, (X, Y) based on 64 X indices and 64 Y indices may be determined to range from (−1, −1) to (−64, −64). In a fourth quadrant of FIG. 4, (X, Y) based on 64 X indices and 64 Y indices may be determined to range from (0, −1) to (−63, −64).

Figure 5:
FIG. 5 is a conceptual view illustrating LUT information for a 64-NUC having a specific resolution according to an embodiment.

FIG. 5 is a conceptual view illustrating LUT information for a 64-NUC having a specific resolution according to an embodiment.

Referring to FIG. 4 and FIG. 5, the LUT information 500 for the 64-NUC according to the embodiment may include an LLR set at each position (X, Y) defined by 64 X indices and 64 Y indices for the first quadrant among the four quadrants by the I-axis and the Q-axis.

For example, when an NUC symbol is related to 6-bit information, the LLR set may include six LLR values.

For example, an LLR set corresponding to a position (0, 0) may include a(0, 0), b(0, 0), c(0, 0), d(0, 0), and e(0, 0). Here, it will be understood that a(0, 0), b(0, 0), c(0, 0), d(0, 0), and e(0, 0) are all integer values.

As described above, a plurality of LLR sets for the remaining quadrants (i.e., the second, third, and fourth quadrants) for the resolution of 128×128 may be obtained using the I-Q symmetry without additional information.

For a clear and concise understanding of FIG. 5, it may be assumed that an I value of input information for the 64-NUC of FIG. 4 is 16 and a Q value is −160.

TABLE 1

Xidx = int(abs(real(In[k]x5)/16)), If Xidx > 63 => Xidx = 63
Yidx int(abs(imag(In[k]x5)/16)), If Yidx > 63 => Yidx = 63

Referring to Table 1, an X index Xidx for LUT information may be obtained as 5, and a Y index Yidx for the LUT information may be obtained as 50.

Referring to FIG. 5, an LLR set corresponding to a position (5, 50) may be obtained. In this case, the LLR set corresponding to the position (5, 50) of FIG. 5 may be [4, −31, −22, −9, −1, −6].

According to the foregoing assumption, since the I value is 16 (I>0) and the Q value is −160 (Q<0), the sign of a second LLR value included in the LLR set may be set in reverse. Accordingly, a finally obtained LLR set is [4, 31, −22, −9, −1, −6]. The absolute values of LLR values included in the LLR set denote reliability.

According to the foregoing assumption, when (I, Q) of (16, −160) is used as input and a resolution for the 64-NUC is 128×128, the actual coordinate values of (16, −160) are (0.125, −1.25). That is, (16, −160) is positioned between 001101 and 001111.

A fifth LLR value in the LLR set [4, 31, −22, −9, −1, −6] is considerably low in reliability, because an actual coordinate is positioned halfway between 001101 and 001111.

When an LLR value included in the LLR set is a positive value, the LLR value may be expressed as 1, and when an LLR value included in the LLR set is a negative value, the LLR value may be expressed as 0. That is, LLR information obtained based on the LLR set [4, 31, −22, −9, −1, −6] is 001111.

Figure 6:
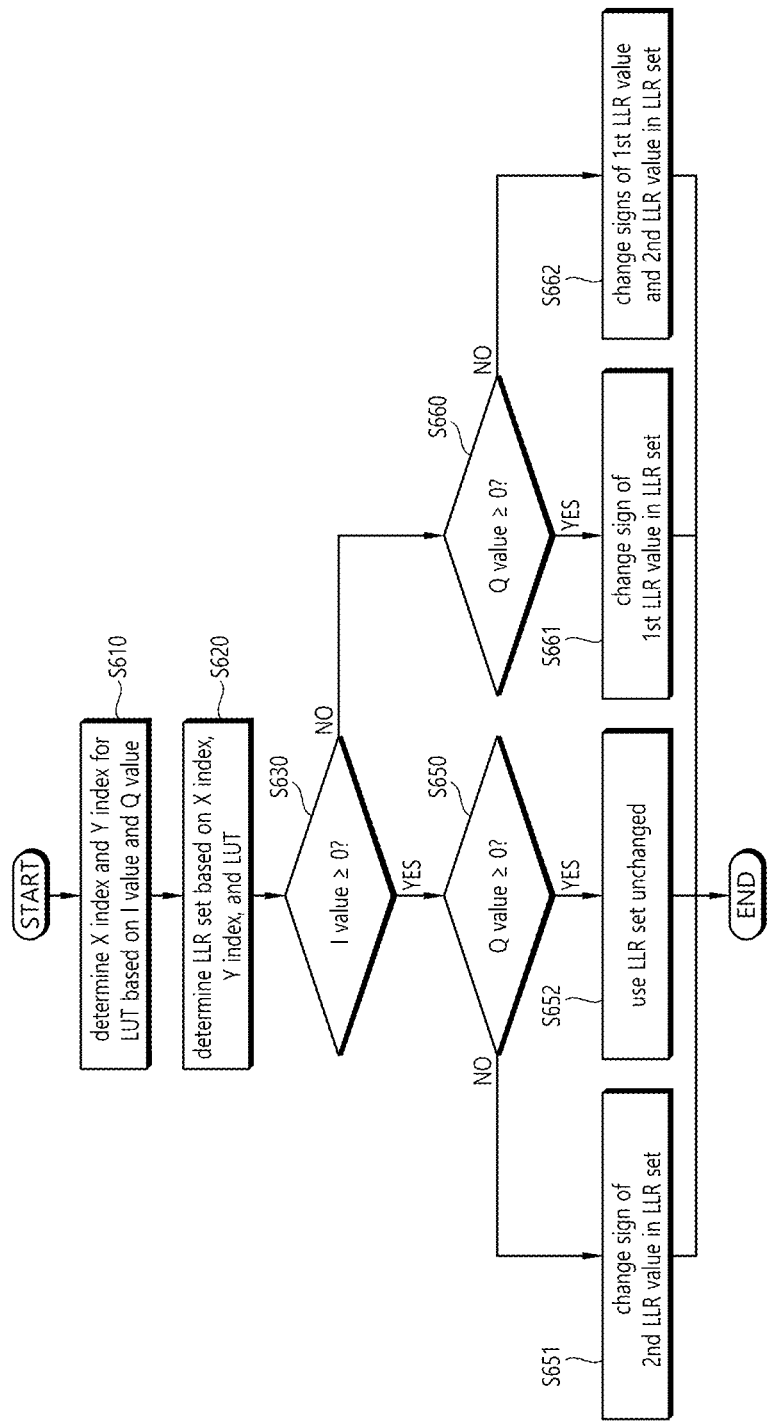
FIG. 6 is a flowchart illustrating a process for determining an LLR value based on an LUT according to an embodiment.

FIG. 6 is a flowchart illustrating a process for determining an LLR value based on an LUT according to an embodiment.

Referring to FIG. 1 to FIG. 6, for a clear and concise description of FIG. 6, FIG. 6 is described based on a first NUC demapper 210. However, it will be understood that an operation of determining an LLR value based on the following LUT is independently performed by the first NUC demapper 210 and a second NUC demapper 220 of a wireless device (e.g., 200).

In operation S610, the NUC demapper 210 may determine an X index Xidx and a Y index Yidx for LUT information based on an I value and a Q value related to equalized input information ŷ1. For example, when the I value and the Q value are (16, −160), the X index Xidx and the Y index Yidx may be determined to be (5, 50) using Table 1 illustrated above.

In operation S620, the NUC demapper 210 may determine an LLR set based on the X index Xidx, the Y index Yidx, and predetermined LUT information (e.g., 500 in FIG. 5). For example, when the X index Xidx and the Y index Yidx are (5, 50), the LLR set determined through Table 1 is [4, −31, −22, −9, −1, −6].

In operation S630, the NUC demapper 210 may determine whether the I value related to the equalized input information ŷ1 is 0 or greater.

Referring to FIG. 6, when the I value related to the equalized input information ŷ1 is 0 or greater, operation S650 is performed. When the I value related to the equalized input information ŷ1 is less than 0, operation S660 is performed.

In operation S650, the NUC demapper 210 may determine whether the Q value related to the equalized input information ŷ1 is 0 or greater.

Referring to FIG. 6, when the Q value related to the equalized input information ŷ1 is 0 or greater, operation S652 is performed. When the Q value related to the equalized input information ŷ1 is less than 0, operation S651 is performed.

In operation S651, the NUC demapper 210 may change the sign of a second LLR value of the LLR set determined in operation S620. For example, the NUC demapper 210 may change the sign of the second LLR value of [4, −31, −22, −9, −1, −6].

Accordingly, first LLR information (e.g., LLR_1 in FIG. 2) finally obtained by the NUC demapper 210 is [4, 31, −22, −9, −1, −6].

In operation S652, the NUC demapper 210 may use the LLR set determined in operation S620 as it is. For example, first LLR information (e.g., LLR_1 in FIG. 2) finally obtained by the NUC demapper 210 is [4, −31, −22, −9, −1, −6].

In operation S660, the NUC demapper 210 may determine whether the Q value related to the equalized input information ŷ1 is 0 or greater.

Referring to FIG. 6, when the Q value related to the equalized input information ŷ1 is 0 or greater, operation S661 is performed. When the Q value related to the equalized input information ŷ1 is less than 0, operation S662 is performed.

In operation S661, the NUC demapper 210 may change the sign of a first LLR value of the LLR set determined in operation S620. For example, the NUC demapper 210 may change the sign of the first LLR value of [4, −31, −22, −9, −1, −6].

Accordingly, first LLR information (e.g., LLR_1 in FIG. 2) finally obtained by the NUC demapper 210 is [−4, −31, −22, −9, −1, −6].

In operation S662, the NUC demapper 210 may change the signs of the first and second LLR values of the LLR set determined in operation S620. For example, the NUC demapper 210 may change the signs of the first and second LLR values of [4, −31, −22, −9, −1, −6].

Accordingly, first LLR information (e.g., LLR_1 in FIG. 2) finally obtained by the NUC demapper 210 is [−4, 31, −22, −9, −1, −6].

Figure 7:
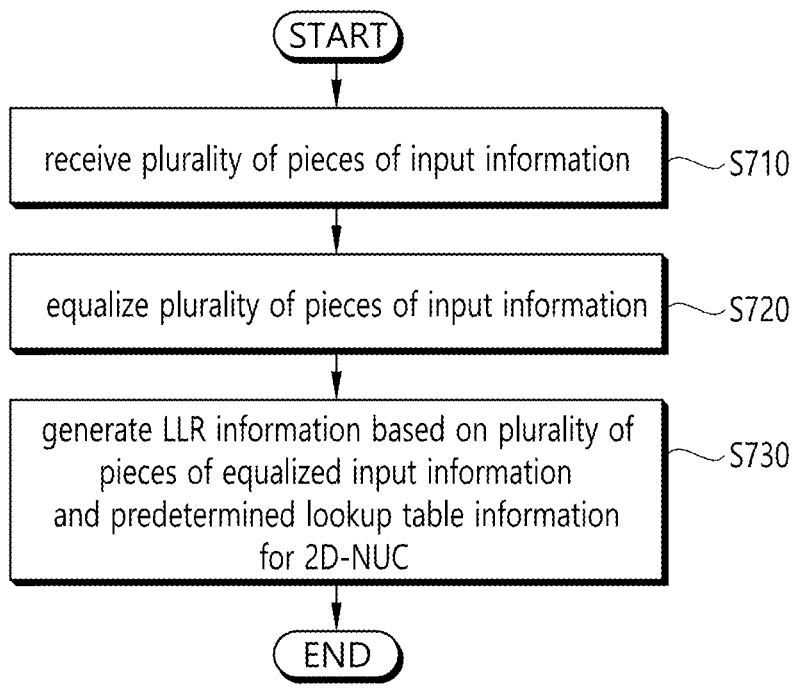
FIG. 7 is a flowchart illustrating a method for supporting a reception operation based on a 2D-NUC according to an embodiment.

FIG. 7 is a flowchart illustrating a method for supporting a reception operation based on a 2D-NUC according to an embodiment.

Referring to FIG. 1 to FIG. 7, in operation S710, a first wireless device (e.g., 200 in FIG. 2) may receive a plurality of pieces of input information (e.g., y1 and y2 in FIG. 2) from a second wireless device (not shown). For example, the plurality of pieces of input information may be first input information and second input information (e.g., y1 and y2 in FIG. 2).

In operation S720, the first wireless device (e.g., 200 of FIG. 2) may equalize the plurality of pieces of input information (e.g., y1 and y2 of FIG. 2). For example, an operation of equalizing the plurality of pieces of received input information (e.g., y1 and y2 in FIG. 2) may be performed by a ZF/MMES equalizer 205 of the first wireless device (e.g., 200 in FIG. 2).

The ZF/MMES equalizer 205 may transmit a plurality of equalized input signals (e.g., ỹ1 and ỹ2 of FIG. 2) as input to a plurality of NUC demappers (e.g., 210 and 220), respectively.

For example, the equalized first input information (e.g., ỹ1 of FIG. 2) may be configured based on a first inphase (I) value and a first quadrature (Q) value. The equalized second input information (e.g., ỹ2 of FIG. 2) may be configured based on a second I value and a second Q value.

In operation S730, the first wireless device (e.g., 200 of FIG. 2) may generate LLR information LLR_I based on the equalized first input information and the equalized second input information (e.g., ỹ1 and ỹ2 of FIG. 2) and lookup table (LUT) information (e.g., 500 of FIG. 5) predetermined for the 2D-NUC.

Specifically, as described above with reference to FIG. 5, the first NUC demapper 210 of the first wireless device (e.g., 200 of FIG. 2) may determine a first LLR set based on the equalized first input information (e.g., ỹ1 of FIG. 2) and the lookup table (LUT) information (e.g., 500 of FIG. 5).

Further, as described above with reference to FIG. 6, the first NUC demapper 210 of the first wireless device (e.g., 200 of FIG. 2) may determine first LLR information (e.g., LLR_1 of FIG. 2) based on the signs of the first I value and the first Q value.

Specifically, as described above with reference to FIG. 5, the second NUC demapper 220 of the first wireless device (e.g., 200 of FIG. 2) may determine a second LLR set based on the equalized second input information (e.g., ỹ2 of FIG. 2) and the lookup table (LUT) information (e.g., 500 of FIG. 5).

For example, each of the first LLR information (e.g., LLR_1 of FIG. 2) and second LLR information (e.g., LLR_2 of FIG. 2) may include six LLR values.

Further, as described above with reference to FIG. 6, the second NUC demapper 220 of the first wireless device (e.g., 200 of FIG. 2) may determine the second LLR information (e.g., LLR_2 of FIG. 2) based on the signs of the second I value and the second Q value.

In addition, the first wireless device (e.g., 200 of FIG. 2) may generate the LLR information LLR_I by performing a concatenation operation based on the first LLR information (e.g., LLR_1 of FIG. 2) and the second LLR information (e.g., LLR_2 of FIG. 2) (e.g., LLR_1 and LLR_2 alternately).

The LLR information LLR_I may be used as input to a decoding module (e.g., 230 of FIG. 2) using an LDPC code included in the first wireless device (e.g., 200 of FIG. 2).

For example, the lookup table information may be generated based on Equation 4.

$$\min_{x \in \chi_m^0}(\|\tilde{y} - x\|^2) - \min_{x \in \chi_m^1}(\|\tilde{y} - x\|^2) \qquad \text{[Equation 4]}$$

In this case, the lookup table information may be information stored in advance and managed in a processor (not shown) of the first wireless device (e.g., 200 of FIG. 2).

According to the embodiment, when a 64-NUC is used for the 2D-NUC, a resolution of 128×128 may be set for the 64-NUC. Further, the lookup table information (e.g., 500 of FIG. 5) may be defined based on 64 X indices and 64 Y indices related to the first quadrant by the I-axis and the Q-axis.

That is, a plurality of LLR sets for the remaining quadrants (i.e., the second, third, and fourth quadrants) for the resolution of 128×128 may be obtained through the predetermined lookup table information (e.g., 500 of FIG. 5) using the I-Q symmetry without additional information.

According to the embodiment, it is possible to provide a method for supporting a reception operation based on a 2D-NUC and a wireless device using the same, which are capable of remarkably reducing the complexity of a demapper for LLR calculation to ∂(1) while maintaining the performance of a receiver having a high data rate.

Figure 8:
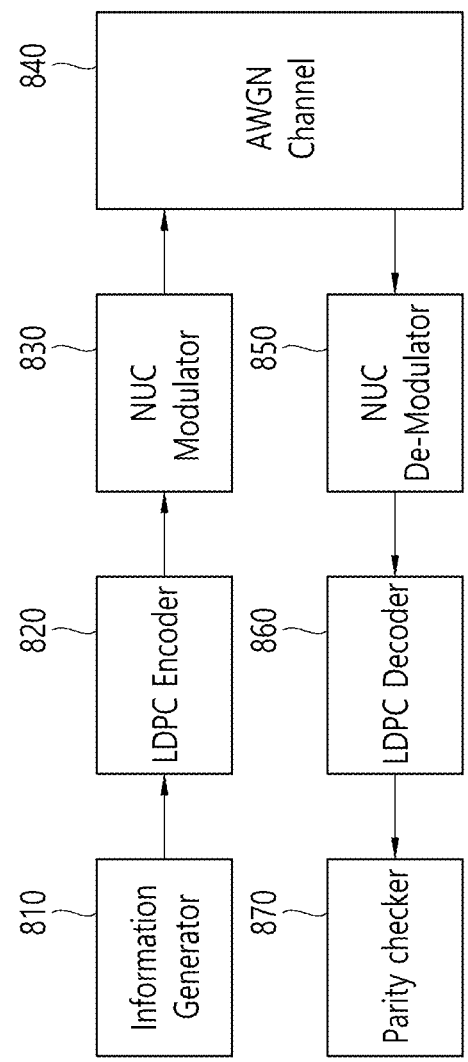
FIG. 8 illustrates a block diagram for a simulation based on a 64-NUC according to an embodiment.

FIG. 8 illustrates a block diagram for a simulation based on a 64-NUC according to an embodiment.

Referring to FIG. 8, an information generator 810, an LDPC encoder 820, and an NUC modulator 830 may be related to a transmission terminal of the simulation. A wireless signal generated by a reception terminal may pass through an additive white Gaussian noise (AWGN) channel 840. An NUC demodulator 850, an LDPC decoder 860, and a parity checker 870 may be related to the reception terminal of the simulation.

Figure 9:
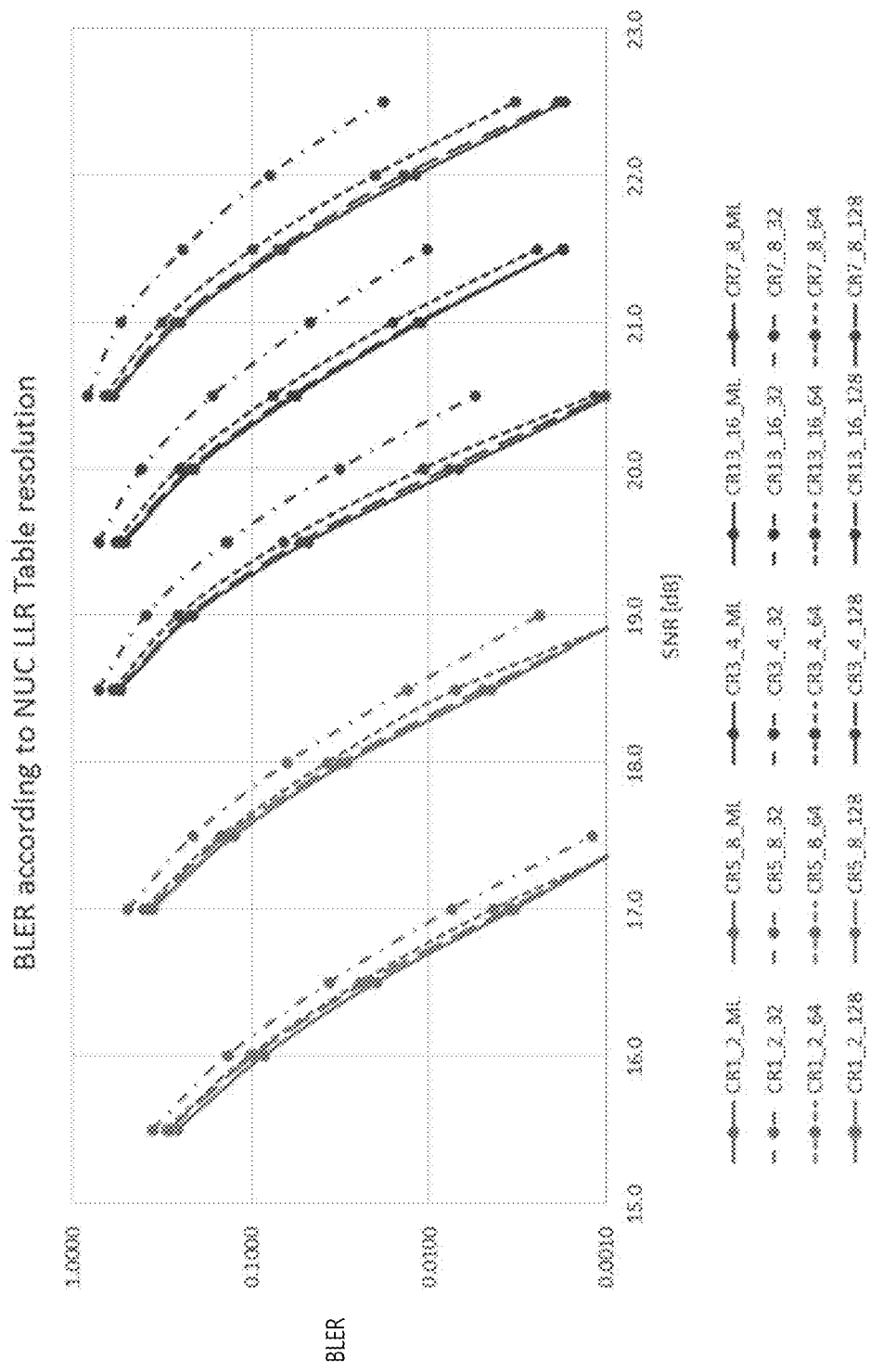
FIG. 9 illustrates a simulation result based on a 64-NUC according to an embodiment.

FIG. 9 illustrates a simulation result based on a 64-NUC according to an embodiment.

FIG. 9 illustrates the result of a simulation performed based on resolutions of 32, 64, and 128 of a lookup table using LDPC coding rates of 1/2, 5/8, 3/4, 13/16, and 7/8 according to IEEE 802.11ay in a simulation environment of FIG. 8.

Referring to FIG. 9, performance based on a lookup table having a resolution of 64 shows only deterioration within about 0.2 dB compared to performance based on the ML algorithm.

Figure 10:
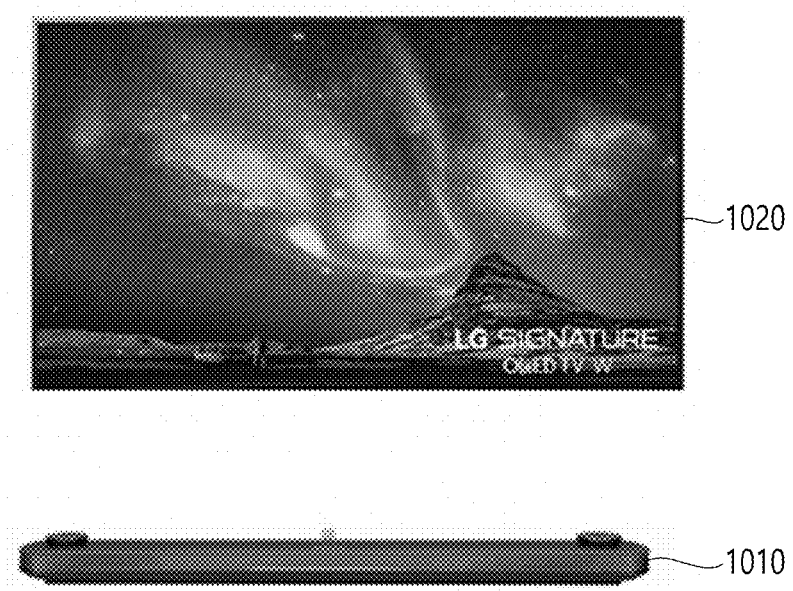
FIG. 10 illustrates an application example of a wireless device supporting a reception operation based on a 2D-NUC.

FIG. 10 illustrates an application example of a wireless device supporting a reception operation based on a 2D-NUC.

The wireless device supporting the reception operation based on the 2D-NUC mentioned above with reference to FIG. 1 to FIG. 9 may be applied to both of a first device 1010 corresponding to a main body or a second device 1020 corresponding to a TV panel.

Figure 11:
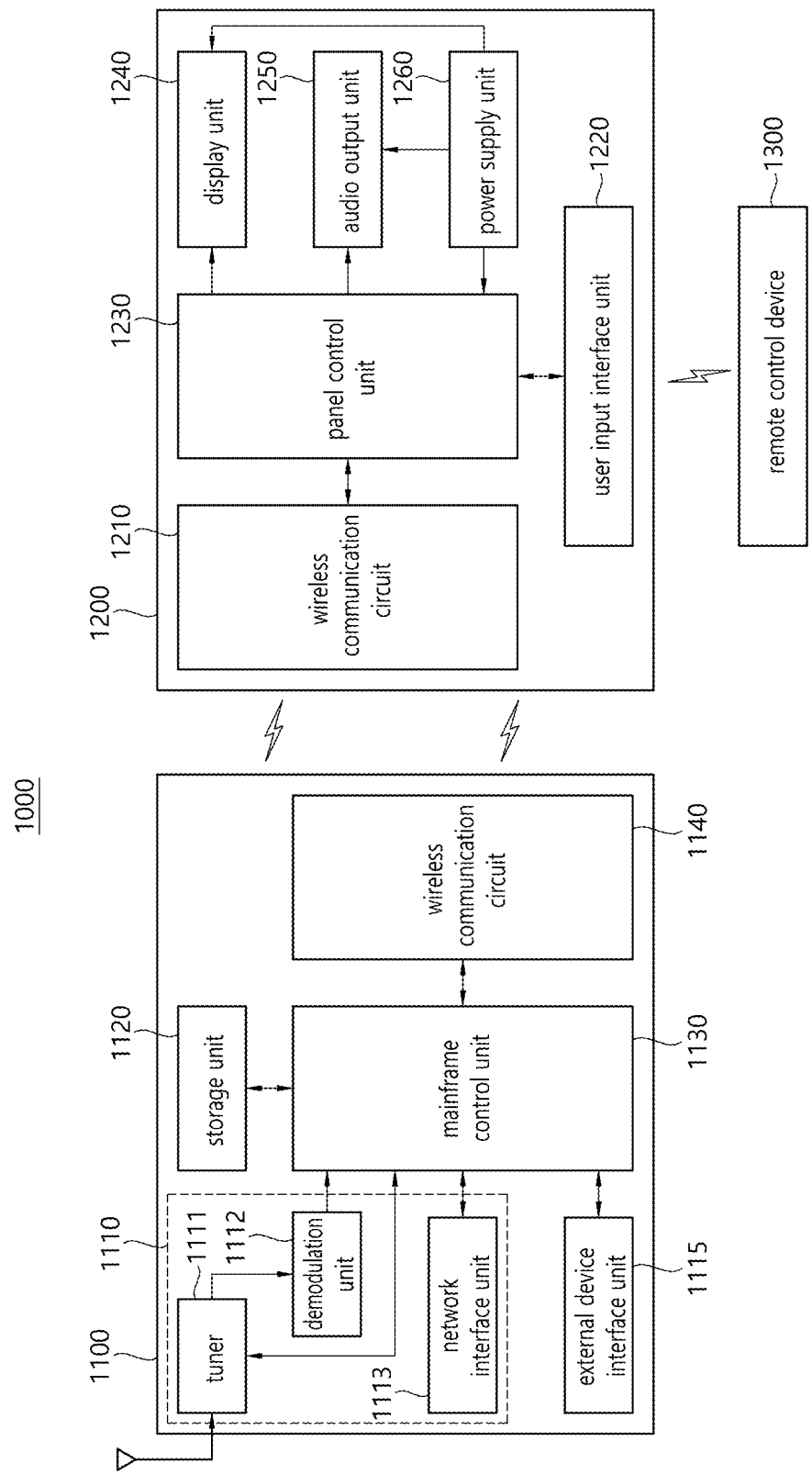
FIG. 11 is a block diagram illustrating an application example of a wireless AV system performing channel tracking according to an embodiment.

FIG. 11 is a block diagram illustrating an application example of a wireless AV system performing channel tracking according to an embodiment.

Referring to FIG. 11, a wireless AV system (1000) may include a main body device (1100) and a panel device (1200).

The main body device (1100) may include a broadcast receiver (1110), an external device interface unit (1115), a storage unit (1120), a main body controller (1130), and a wireless communication unit (1140).

The broadcast receiver (1110) may include a tuner (1111), a demodulator (1112), and a network interface unit (1113).

The tuner (1111) may select a specific broadcast channel in accordance with a channel selection command. The tuner (1111) may receive a broadcast signal corresponding to the selected specific broadcast channel.

The demodulator (1112) may separate the received broadcast signal to a video signal, an audio signal, and a data signal related to a broadcast program. And, then, the demodulator (1112) may restore (or recover) the separated video signal, audio signal, and data signal to a format that can be outputted.

The network interface unit (1113) may provide an interface for connecting the wireless AV system (1000) to a wired/wireless network including an internet network. The network interface unit (1113) may transmit or receive data to or from another user or another electronic device through an accessed network or another network linked to the accessed network.

The network interface unit (1113) may access a predetermined webpage through an accessed network or another network linked to the accessed network. That is, the network interface unit (1113) may transmit or receive data to or from a corresponding server by accessing a predetermined webpage through the network.

Also, the network interface unit (1113) may receive contents or data provided from a content provider or a network operator. That is, the network interface unit (1113) may receive contents such as movies, advertisements, games, VODs, and broadcast signals, which are provided from a content provider or a network provider, and related information through network.

Additionally, the network interface unit (1113) may receive firmware update information and update files provided from a network operator and may transmit data to an internet or content provider or a network operator.

The network interface unit (1113) may select and receive a wanted application among applications that are open to public, through the network.

The external device interface unit (1115) may receive an application or an application list of a nearby (or neighboring) external device and may communicate (or deliver) the application or application list to the storage unit (1120) or main body controller (1130).

The external device interface unit (1115) may provide a connection path between the wireless AV system (1000) and an external device. The external device interface unit (1115) may receive at least one of image (or video) and audio outputted from an external device (not shown), which is connected to the wireless AV system (1000) via wired or wireless connection, and may then deliver the received image and/or audio to the main body controller (1130). The external device interface unit (1115) may include multiple external input terminals. The multiple external input terminals may include RGB terminals, one or more High Definition Multimedia Interface (HDMI) terminals, component terminals.

A video signal of an external device that is inputted through the external device interface unit (1115) may be outputted through a display unit (1240) after passing through a wireless communication unit. An audio signal of an external device that is inputted through the external device interface unit (1115) may be outputted through an audio output unit (1250).

An external device that is connectable to the external device interface unit (1115) may be any one of a set-top box, a Bluray player, a DVD player, a gaming system, a sound bar, a smart phone, a PC, a USB memory, a home theater system. However, this is merely exemplary.

Additionally, some content data stored in the wireless AV system (1000) may be transmitted to a user or an electronic device, which is selected from other users or other electronic devices that are pre-registered in the wireless AV system (1000).

The storage unit (1120) may store programs for performing each signal processing and control within the main body controller (1130), and then the storage unit (1120) may store signal-processed image, voice, or data signals.

Additionally, the storage unit (1120) may perform a function for temporarily storing image, voice, or data signals that are inputted from the external device interface unit (1115) or network interface unit (1113), and the storage unit (1120) may also store information related to a predetermined image through a channel memory function.

The storage unit (1120) may store an application or an application list that is inputted from the external device interface unit (1115) or network interface unit (1113).

The wireless AV system (1000) may play (or reproduce) content files (video files (or moving picture image files), still image files, music files, document files, application files, and so on) that are stored in the storage unit (1120) and may provide the content files to a user.

The main body controller (1130) may control the overall operations of the wireless AV system (1000).

In order to display an image on a display unit (1240), the main body controller (1130) may operate a panel controller (1230) through a control signal. For example, the main body controller (1130) may perform control operations so that a broadcast image being inputted through the tuner (1111), or an external input image being inputted through the external device interface unit (1115), or an image being inputted through the network interface unit (1113), or an image being stored in the storage unit (1120) can be displayed on the display unit (1240). In this case, the image being displayed on the display unit (1240) may be a still image or a video (i.e., moving picture image), and the image may also be a 2D image or 3D image.

A video-processed video signal that is processed by the main body controller (1130) may be inputted to the display unit (1240), after passing through a wireless communication unit (1140, 1210), and may then be displayed as an image corresponding to the video-processed video signal. Additionally, the video-processed video signal that is processed by the main body controller (1130) may be inputted to an external output device through the external device interface unit (1115).

An audio-processed video signal that is processed by the main body controller (1130) may be audio-outputted through an audio output unit (1250), after passing through the wireless communication unit (1140, 1210). Additionally, the audio-processed video signal that is processed by the main body controller (1130) may be inputted to an external output device through the external device interface unit (1115).

The wireless communication unit (1140) may be wirelessly connected to the wireless communication unit (1210), which is included in the panel device (1200), according to a specific communication protocol. The wireless communication unit (1140) may transmit information that is received from the main body controller (1130) to the panel device (1200) or may receive information from the panel device (1200).

The panel device (1120) may include a wireless communication unit (1210), a user input interface unit (1220), a panel controller (1230), a display unit (1240), an audio output unit (1250), and a power supply unit (1260).

The wireless communication unit (1210) may be wirelessly connected to the wireless communication unit (1140), which is included in the main body device (1100), according to a specific communication protocol. The wireless communication unit (1210) may transmit information that is received from the panel controller (1230) to the main body device (1100) or may receive information from the main body device (1100).

The user input interface unit (1220) may communicate (or deliver) signals that are inputted by the user to the panel controller (1230) or communicate (or deliver) signals from the panel controller (1230) to the user.

For example, the user input interface unit (1220) may receive or process control signals, such as power on/off, channel selection, and screen settings from a remote control device (1300) or may transmit control signals from the panel controller (1230) to the remote control device (1300) according to various communication methods, such as Bluetooth, Ultra Wideband (UWB), ZigBee, Radio Frequency (RF), or Infrared (IR) communication, and so on.

Additionally, the user input interface unit (1220) may communicate (or deliver), to the panel controller (1230), control signals that are inputted from a local key (not shown), such as a power key, a channel key, a volume key, a setup key, and so on.

Meanwhile, the panel controller (1230) may control the panel device (1200) based on a user command that is inputted through the user input interface unit (1220), or based on a control signal or internal program that is inputted through the main body controller (1130).

The panel controller (1230) may allow information on a channel that is selected by the user, and so on, to be outputted together with the processed video or audio signal through the display unit (1240) or audio output unit (1250).

Additionally, according to an external device image playback command that is received through the user input interface unit (1220), the panel controller (1230) may output image signals (or video signals) or voice signals (audio signals) of an external device, such as a camera or a camcorder, which are inputted through the external device interface unit (1115), to the display unit (1240) or the audio output unit (1250).

The reception operation based on 2D-NUC (2 Dimensional Non-Uniform Constellation) mentioned throughout this specification may be supported by the panel controller 1230.

The display unit (1240) may convert image signals, data signals, or OSD signals, which are processed in the main body controller (1130), or images signals or data signals, which are received in the external device interface unit (1115), into R, G, and B signals so as to generate driving signals.

Meanwhile, the wireless AV system (1000) shown in FIG. 11 is merely an exemplary application of the present specification. And, therefore, among the components shown in FIG. 11, some of the components may be integrated, added, or omitted according to the specification of the wireless AV system (1000) that is actually implemented.

According to another embodiment of the present specification, unlike the example shown in FIG. 11, the wireless AV system (1000) may receive an image through a network interface unit (1113) or external device interface unit (1115), without being equipped with a tuner (1111) and a demodulator (1112), and may then play (or reproduce) the received image.

For example, the wireless AV system (1000) may be separately implemented to include an image processing device, such as a set-top box for receiving broadcast signals or contents according to various network services, and a content playing device, which plays (or reproduces) contents that are inputted from the image processing device.

Although a detailed embodiment is described in the detailed description of the present specification, it will be apparent that various modifications can be made without departing from the scope of the present specification. And, therefore, the scope of the present specification shall not be limited only to the above-described embodiment and shall rather be determined based on the scope of the claims that will hereinafter be described as well as the equivalents of the scope of the claims of the present disclosure.

What is claimed is:

1. A method for supporting a reception operation based on a 2-dimensional non-uniform constellation (2D-NUC), the method comprising:
   receiving, by a first wireless device, first input information and second input information from a second wireless device;
   equalizing, by the first wireless device, the first input information and the second input information; and
   generating, by the first wireless device, log likelihood ratio (LLR) information based on the equalized first input information, the equalized second input information, and predetermined lookup table information for the 2D-NUC,
   wherein the equalized first input information is configured based on a first inphase (I) value and a first quadrature (Q) value,
   wherein the equalized second input information is configured based on a second I value and a second Q value,
   wherein first LLR information in the LLR information is determined based on a first LLR set, a sign of the first I value, and a sign of the first Q value, and
   wherein the first LLR set is determined based on the equalized first input information and the lookup table information.

2. The method of claim 1, when a 64-NUC is used for the 2D-NUC, a resolution of 128×128 is set for the 64-NUC, and
   wherein the lookup table information is defined based on 64 X indices and 64 Y indices.

3. The method of claim 1,
   wherein second LLR information in the LLR information is determined based on a second LLR set, a sign of the second I value, and a sign of the second Q value, and wherein the second LLR set is determined based on the equalized second input information and the lookup table information.

4. The method of claim 3, wherein the generating of the LLR information further comprise generating the LLR information by performing a concatenation operation based on the first LLR information and the second LLR information.

5. The method of claim 3, wherein each of the first LLR set and the second LLR set comprises six LLR values.

6. The method of claim 1, wherein the LLR information is used as input to a decoding module using a low-density parity-check (LDPC) code comprised in the first wireless device.

7. The method of claim 1, wherein the lookup table information is generated based on a following equation:

$$\min_{x \in \chi_m^0}(\|\tilde{y} - x\|^2) - \min_{x \in \chi_m^1}(\|\tilde{y} - x\|^2).$$

8. The method of claim 1, wherein the lookup table information is stored in a processor of the first wireless device.

9. A first wireless device for supporting a reception operation based on a 2-dimensional non-uniform constellation (2D-NUC), the wireless device comprising:
a memory;
a transceiver; and
a processor operatively coupled to the memory and the transceiver,
wherein processor is configured to:
receive first input information and second input information from a second wireless device;
equalize the first input information and the second input information; and
generate log likelihood ratio (LLR) information based on the equalized first input information, the equalized second input information, and predetermined lookup table information for the 2D-NUC,
wherein the equalized first input information is configured based on a first inphase (I) value and a first quadrature (Q) value,
wherein the equalized second input information is configured based on a second I value and a second Q value,
wherein first LLR information in the LLR information is determined based on a first LLR set, a sign of the first I value, and a sign of the first Q value, and
wherein the first LLR set is determined based on the equalized first input information and the lookup table information.

10. The first wireless device of claim 9,
wherein, when a 64-NUC is used for the 2D-NUC, a resolution of 128×128 is set for the 64-NUC, and
wherein the lookup table information is defined based on 64 X indices and 64 Y indices.

11. The first wireless device of claim 9,
wherein second LLR information in the LLR information is determined based on a second LLR set, a sign of the second I value, and a sign of the second Q value, and
wherein the second LLR set is determined based on the equalized second input information and the lookup table information.

* * * * *